United States Patent [19]
Hardwick

[11] 3,717,925
[45] Feb. 27, 1973

[54] METHOD OF MAKING EXPLOSIVELY WELDED JOINTS

[75] Inventor: Roy Hardwick, Leeds, England

[73] Assignee: Yorkshire Imperial Metals Limited, Stourton, near Leeds, England

[22] Filed: March 1, 1971

[21] Appl. No.: 119,609

[30] Foreign Application Priority Data

March 9, 1970 Great Britain.....................11,181/70

[52] U.S. Cl. ..............29/470.1, 29/157.4, 29/474.3, 29/486, 29/497.5
[51] Int. Cl. ............................................B23k 21/00
[58] Field of Search ......29/421 E, 470.1, 474.3, 486, 29/497.5, 157.4

[56] References Cited

UNITED STATES PATENTS

| | | | |
|---|---|---|---|
| 2,779,279 | 1/1957 | Maiwurm | 29/421 X |
| 3,207,215 | 9/1965 | Whittell, Jr. | 29/157.4 UX |
| 3,409,969 | 11/1968 | Simons et al. | 29/497.5 X |
| 3,503,110 | 3/1970 | Berry et al. | 29/470.1 X |

FOREIGN PATENTS OR APPLICATIONS

| | | | |
|---|---|---|---|
| 251,575 | 5/1926 | Great Britain | 29/479 |
| 766,741 | 1/1957 | Great Britain | 29/421 |
| 269,861 | 11/1950 | Switzerland | 29/479 |

OTHER PUBLICATIONS

Garrett et al. "Broad Applications of Diffusion Bording," NASA CR-409, pp. 111-112, March, 1966.

Primary Examiner—J. Spencer Overholser
Assistant Examiner—Ronald J. Shore
Attorney—Cushman, Darby & Cushman

[57] ABSTRACT

A method of securing in an aperture in a tubeplate of a heat exchanger a thin tube of a corrosion resistant costly metal such as tantalum, in which a thin sheet of cladding, also of tantalum, is placed over the tubeplate in which the tube is secured to the cladding sheet by a lap weld within the aperture by means of an explosive welding technique. The tube is also welded to the tubeplate material within the aperture to ensure lateral rigidity.

6 Claims, 2 Drawing Figures

PATENTED FEB 27 1973 3,717,925

INVENTOR
ROY HARDWICK
BY Cushman Darby & Cushman
ATTORNEYS

METHOD OF MAKING EXPLOSIVELY WELDED JOINTS

BACKGROUND OF THE INVENTION

1. Field of the Invention

This invention relates to a method of securing tubes within a tubeplate by means of an explosive force, and more particularly to the explosive welding of a tube in a bimetallic tubeplate clad with material similar to that of which the tube is made.

2. Description of the Prior Art

When an extremely corrosive medium is in contact with the tubes of a heat exchanger it is sometimes necessary to use a tube material entirely resistant to corrosion by that medium. In some instances, for example, in the case of tantalum, this material may be extremely expensive and provided the pressure requirements of the heat exchanger will permit, it is desirable to make the wall thickness of the tube as thin as possible thus reducing its material content and cost. The tubeplate ideally would also be of the same corrosion resistant material. The tubeplate, however, must have adequate structural strength and rigidity and must be of some specific minimum thickness related to the dimensions and conditions of service of the exchanger. This minimum thickness may be such that it would be prohibitively expensive to construct the tubeplate entirely of the material. In such instances, a tubeplate of cheaper material is used to give structural strength and this is faced or clad with a thin layer of the corrosion resistant material.

When the material being used is extremely expensive, it is desirable to limit the thickness of the facing material to the minimum amount which will provide good protection. This can be done by cladding or facing the tubeplate with a thin sheet of the corrosion resistant material which is formed at the apertures into an outwardly turned flange fitting closely around the protruding end of the tube and fusion welding the flange and tube end to form a seal. Such a weld is extremely difficult to consistently produce, demanding a high degree of operator skill, and the minimum thickness of tube and clad is usually 20 gauge. Thinner components, too, regularly burn through when welding is attempted, thus necessitating costly repair or replacement and rendering it impracticable. Sophisticated welding techniques are also often required to carry out welding of the more refractory or reactive metals.

SUMMARY OF THE INVENTION

According to the present invention, a method of securing a tube in a tubeplate pierced with apertures in which the tubes are to be secured comprises:

providing on a face of the tubeplate a corrosion resistant metal cladding sheet formed with flanged perforations co-axial with the apertures in the tubeplate, the flanges being all on one side of the sheet and extending over and conforming with the surface of at least a portion of the wall of each aperture;

placing a tube of corrosion resistant material weldable to the material of the cladding in an aperture with the end of the tube co-planar with or protruding beyond the plane of the cladding sheet so that the flange and the tube overlap, the overlapping surfaces of tube and flange being spaced apart;

detonating an explosive charge in an inert energy transmitting medium located co-axially with the tube within the aperture so as to expand and effect a metallurgical bond at least between the tube and the flange.

The aperture comprises a portion of nominal bore giving a diametrical clearance of say 0.005 to 0.02 inch and preferably, a portion of the aperture is tapered but the method may also be applied to apertures which are provided with a counterbore.

In order to provide additional anchorage for the tube and thus avoid the effect of operating stresses, one or more circumferential grooves may be machined in the aperture, the tube wall being expanded into the grooves when the explosive charge is detonated.

The method of explosively welding a tube in a tubeplate is described and claimed in our prior United Kingdom patents 1,149,387 and 1,123,836. In the method according to the invention, the overlap between the flange and the tube must be substantial to achieve a good weld and preferably a minimum length of the overlap is three-sixteenths inch for reliable and reproducible results.

As each of the flanges on the cladding sheet covers only a portion of the wall of the aperture, after detonation of the explosive charge, each tube will be welded to a flange and to the wall of an aperture. Thus the tube is securely fixed to the rigid tubeplate and the cladding sheet is securely fixed to each tube as well as to the wall of the aperture.

It is essential that there is a space between the surfaces to be welded together by the detonation of the explosive charge and this is conveniently arranged by providing either a tapered portion or a counterbore in the aperture or by swaging the end portion of the tube to a smaller diameter. In the case of the tapered aperture, the space between the surfaces to be welded together increases with the increasing diameter of the taper but with the counterbore and the swaged tube, the surfaces are parallel. The counterbore is of sufficient diameter to accommodate the flange of the cladding and to give the optimum annular clearance required for welding between the outer surface of the tube and the inner surface of the flange. Similarly, in the case of a swaged tube, the reduced diameter is such as to permit the flange to be accommodated between the wall of the aperture and the reduced portion of the tube with the optimum annular clearance between the surfaces to be welded together. The intersection of the aperture and the face of the tubeplate is preferably radiused or chamfered to provide a good seat for the flange of the perforation in the cladding and the edge of the flange can be chamfered to ensure a smooth profile for the expanded tube.

Preferably the explosive charge is arranged, in the case of the tapered aperture, in such a way that energy is first applied to that part of the tube within the aperture which is separated by the smallest distance from the walls of the aperture and so that the energy travels in the form of a wave in the direction of the adjacent free end of the tube. The released energy expands the tube in such a way that a metallurgical bond is formed over the area of contact at the interface of tube and flange and also of the tube and aperture wall and the interface between flange and aperture wall. Reasonable cleanliness of the surfaces is required to achieve full bonding. Where the tube protrudes beyond the face of the tubeplate, the excess tube is removed by the explosion.

BRIEF DESCRIPTION OF THE DRAWING

One embodiment of the invention will now be described, by way of example, with reference to the accompanying drawings, of which.

DESCRIPTION OF THE PREFERRED EMBODIMENT

Figure 1:
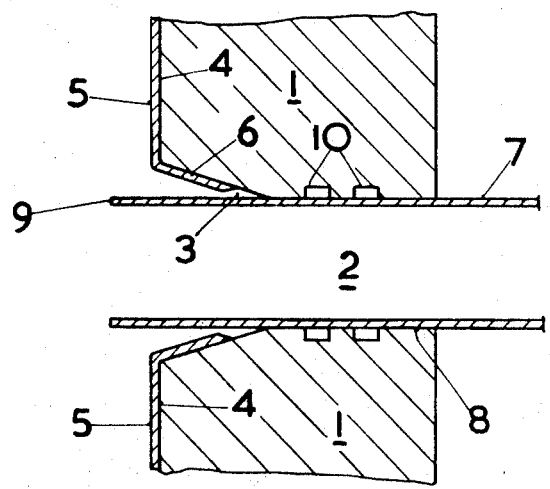
FIG. 1 shows a longitudinal sectional view through an aperture in a tubeplate in which the aperture is tapered over a portion of its length with flange and tube in position prior to inserting an explosive charge.
Figure 2:
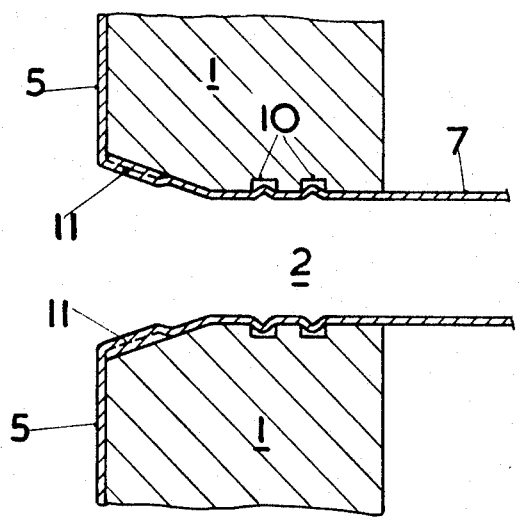
FIG. 2 is a similar view to FIG. 1 showing the aperture and welded tube and flange.

A tubeplate 1 of base material, such as mild steel, is drilled to form an aperture 2 and profiled to a tapered portion 3. The face 4 of the tubeplate is clad with a facing sheet 5 of corrosion resistant metal of minimum thickness 22 gauge, consistent with its mechanical properties and a pilot hole drilled in the facing sheet 5 approximately at the intersection of the axis of the aperture 2 and the sheet. The metal surrounding the hole is deformed into the tapered portion 3 to form an annular flange 6 lining the outermost part of the tapered portion 3.

A tube 7 of corrosion resistant metal of the thinnest gauge consistent with its mechanical properties and operational requirements, is located in the aperture 2 and has an annular clearance of, say, 0.005 to 0.02 inch, in this particular embodiment, in the parallel portion 8 of the aperture. The terminal portion 9 of the tube 7 extends beyond the plane of the facing sheet 5. Grooves 10 are machined in the parallel portion 8 of the aperture 2.

An explosive charge in an inert energy transmitting medium, preferably polythene, is placed coaxially in the aperture 2 in the manner described in our prior published British Patent 1,149,387. A suitable detonator is a No. 8 seismic detonator supplied by the Nobel Division of Imperial Chemical Industries Limited.

After electrical detonation of the charge, the tube 7 is expanded into the grooves 10 and into the tapered portion 3. The interface 11 between flange 6 and tube 7 is metallurgically bonded and the terminal portion 9 is removed flush with the facing sheet 5. The welded interface 11 forms a pressure and liquid-tight seal between tube 7 and facing sheet 5, thereby protecting the tubeplate 1. Axial movement of the tube 7 due to operating stresses and consequential lifting of the facing sheet 5 from the face 4 of the tubeplate, is prevented by the expansion of the tube wall into the grooves 10.

The method according to the invention is particularly advantageous for heat exchangers using high corrosion resistant materials which are costly, such as tantalum, as very thin tube and sheet can be used, thus considerably reducing the weight of tantalum required.

A further advantage of the invention is that a large range of explosives may be employed, in particular, those having a detonation velocity greater than about 120 percent of the velocity of sound in that metal in the tube or tubeplate which has the higher higher sonic velocity. These explosives ensure a good metallurgical bond and reliability of performance.

I claim:

1. A method of securing a metal tube in a metal tubeplate pierced with apertures in which the tubes are to be secured comprising: providing on a face of the tubeplate a corrosion resistant metal cladding sheet formed with flanged perforations coaxial with the apertures in the tubeplate, the flanges being all on one side of the sheet and extending into only the outermost portion of the respective apertures and conforming with the surface of the outermost portions of the walls of the apertures; placing a tube of corrosion resistant material weldable to the material of the cladding in an aperture with the end of the tube co-planar with or protruding beyond the plane of the cladding sheet so that the flange and the tube overlap, the overlapping surfaces of tube and flange being spaced apart; detonating an explosive charge in an inert energy transmitting medium located co-axially with the tube within the aperture so that the energy of detonation travels in the form of a wave moving toward said end of said tube thereby expanding said end and effecting a metallurgical bond between the flange and a longitudinal portion of the tube and between an adjacent longitudinal portion of the tube and that portion of the wall of the aperture not covered by said flange.

2. A method as claimed in claim 1 in which at least a portion of the length of the aperture is tapered, wherein the distance between the outer wall of the tube and the walls of the aperture increases towards the adjacent free end of the tube.

3. A method as claimed in claim 1 in which one or more circumferential grooves are provided in the wall of the aperture and the tube wall is expanded into the grooves by detonation of the explosive charge.

4. A method as claimed in claim 1 in which the edge of the flange is chamfered.

5. A method according to claim 1 in which the tube and cladding sheet are of tantalum.

6. A method as in claim 1 wherein the wave of detonation energy has a velocity greater than about 120 percent of the velocity of sound in the metal of the tube or tubeplate and wherein the wave first bonds the tube first to the wall of the aperture and then to the flange.

* * * * *